(12) United States Patent
Silverman et al.

(10) Patent No.: US 11,468,342 B2
(45) Date of Patent: Oct. 11, 2022

(54) SYSTEMS AND METHODS FOR GENERATING AND USING KNOWLEDGE GRAPHS

(71) Applicant: JPMORGAN CHASE BANK, N.A., New York, NY (US)

(72) Inventors: David Seth Silverman, Chicago, IL (US); Steven Grill, Fair Lawn, NJ (US); Malcolm West, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 420 days.

(21) Appl. No.: 16/569,014

(22) Filed: Sep. 12, 2019

(65) Prior Publication Data

US 2020/0090053 A1   Mar. 19, 2020

Related U.S. Application Data

(60) Provisional application No. 62/731,170, filed on Sep. 14, 2018.

(51) Int. Cl.
  *G06F 17/00* (2019.01)
  *G06N 5/02* (2006.01)
  *G06F 40/169* (2020.01)
  *G06F 40/253* (2020.01)

(52) U.S. Cl.
  CPC .......... *G06N 5/025* (2013.01); *G06F 40/169* (2020.01); *G06F 40/253* (2020.01)

(58) Field of Classification Search
  CPC ...... G06N 5/025; G06F 40/253; G06F 40/169
  See application file for complete search history.

(56) References Cited

U.S. PATENT DOCUMENTS

| | | | |
|---|---|---|---|
| 7,383,169 B1 * | 6/2008 | Vanderwende | G06F 40/30 704/9 |
| 9,110,882 B2 * | 8/2015 | Overell | G06N 5/02 |
| 9,535,902 B1 | 1/2017 | Michalak et al. | |
| 10,019,537 B1 * | 7/2018 | Tsypliaev | G06F 16/9024 |
| 10,521,410 B2 * | 12/2019 | McAteer | G06F 16/2246 |

(Continued)

OTHER PUBLICATIONS

International Search Report, dated Nov. 29, 2019, from corresponding International Application No. PCT/US2019/050840.

(Continued)

*Primary Examiner* — Mohammed H Zuberi
(74) *Attorney, Agent, or Firm* — Greenberg Traurig LLP

(57) ABSTRACT

Systems and methods for generating and using knowledge graphs are disclosed. In one embodiment, in an information processing apparatus comprising at least one computer processor a method for generating a knowledge graph may include: (1) receiving data from at least one data source; (2) identifying facts in the data; (3) generating a relationship triple for each fact, wherein the relationship triples identify a subject, a predicate, and an object; and (4) populating the knowledge graph comprising nodes and edges with the relationship triples, wherein the nodes represent the subjects and the objects, and the edges represent the predicates, wherein each edge is associated with a weighting indicating a strength of the predicate relationship between the subject and the object.

20 Claims, 7 Drawing Sheets

(56) References Cited

U.S. PATENT DOCUMENTS

| | | | | |
|---|---|---|---|---|
| 2008/0005147 | A1* | 1/2008 | Khushraj | G06F 16/288 |
| | | | | 707/999.102 |
| 2013/0212057 | A1* | 8/2013 | Lee | G06F 16/367 |
| | | | | 706/47 |
| 2013/0346467 | A1* | 12/2013 | Rosu | G06F 16/9024 |
| | | | | 709/201 |
| 2014/0156633 | A1* | 6/2014 | Duan | G06F 16/2453 |
| | | | | 707/713 |
| 2014/0237000 | A1* | 8/2014 | Lorge | G06F 16/2452 |
| | | | | 707/794 |
| 2015/0339573 | A1* | 11/2015 | Flinn | G06F 40/30 |
| | | | | 706/12 |
| 2016/0283589 | A1* | 9/2016 | Bostick | G06F 16/367 |
| 2017/0032052 | A1* | 2/2017 | Raman | G06F 16/9024 |
| 2017/0132329 | A1 | 5/2017 | Yakout et al. | |
| 2017/0371923 | A1* | 12/2017 | Arroyo | G06F 16/245 |
| 2019/0354544 | A1* | 11/2019 | Hertz | G06N 5/00 |
| 2020/0073932 | A1* | 3/2020 | Jia | G06N 7/005 |
| 2020/0242349 | A1* | 7/2020 | Ferreira Moreno | G06V 30/416 |
| 2022/0121674 | A1* | 4/2022 | Hasan | G06F 16/27 |

OTHER PUBLICATIONS

Written Opinion of the International Searching Authority, dated Nov. 29, 2019, from corresponding International Application No. PCT/US2019/050840.

* cited by examiner

SYSTEMS AND METHODS FOR GENERATING AND USING KNOWLEDGE GRAPHS

RELATED APPLICATIONS

This application claims the benefit of U.S. Provisional Patent Application Ser. No. 62/731,170, filed Sep. 14, 2018, the disclosure of which is hereby incorporated, by reference, in its entirety.

BACKGROUND OF THE INVENTION

1. Field of the Invention

The present disclosure generally relates to systems and methods for generating and using knowledge graphs.

2. Description of Related Art

There is generally no simple way to hold information or facts that are collected over time, and to make those facts accessible across an organization. In addition, the ability to retrieve relevant content is generally limited to simple text searching against a subset of content identified by predefined attributes.

SUMMARY OF THE INVENTION

Systems and methods for generating and using knowledge graphs are disclosed. In one embodiment, in an information processing apparatus comprising at least one computer processor a method for generating a knowledge graph may include: (1) receiving data from at least one data source; (2) identifying facts in the data; (3) generating a relationship triple for each fact, wherein the relationship triples identify a subject, a predicate, and an object; and (4) populating the knowledge graph comprising nodes and edges with the relationship triples, wherein the nodes represent the subjects and the objects, and the edges represent the predicates, wherein each edge is associated with a weighting indicating a strength of the predicate relationship between the subject and the object.

In one embodiment, the relationship triple may be based on a taxonomy. The taxonomy may be based on at least one of an organization type, a good or service, entities, and an agreement.

In one embodiment, the taxonomy may be generated from the data.

In one embodiment, the data source may include a relational database, a graph database, an XML database, and/or a HTML database.

In one embodiment, the facts may be identified using a standard library, such as a legal library, a financial library, etc. The facts may also be identified using keyword searching, text analysis, or semantic analysis.

In one embodiment, the method may further include expanding the knowledge graph based on additional content comprising at least one of laws, rules, policies, and procedures.

In one embodiment, the weightings may be at least partially based on user feedback. The user feedback may include active feedback and/or passive feedback.

In one embodiment, the weightings may be at least partially based on machine learning.

In one embodiment, the population of the knowledge graph may be an iterative process.

In one embodiment, the knowledge graph may be populated using a curation process.

In one embodiment, the method may further include receiving, from a query device, a query; identifying at least one of a node and an edge related to the query; and returning the identified at least one node and edge to the query device.

According to another embodiment, a system for generating a knowledge graph may include at least one data source; a knowledge graph repository; and a computing device comprising at least one computer processor and executing a computer program. The computer program may receive data from at least one data source, may identify facts in the data, may generate a relationship triple for each fact, wherein the relationship triples identify a subject, a predicate, and an object; may populate a knowledge graph comprising nodes and edges with the relationship triples, wherein the nodes represent the subjects and the objects, and the edges represent the predicates, wherein each edge is associated with a weighting indicating a strength of the predicate relationship between the subject and the object, and may store the knowledge graph in the knowledge graph repository.

In one embodiment, the facts may be identified using keyword searching, text analysis, or semantic analysis.

In one embodiment, the weightings may be at least partially based on user feedback, wherein the user feedback comprises at least one of active feedback and passive feedback.

In one embodiment, the system may include at least one query device, and the computer program may receive a query from the query device, identify at least one of a node and an edge related to the query, and may return the identified at least one node and edge to the query device.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for knowledge graphing are disclosed.

In embodiments, the expertise and knowledge of an organization may be captured and utilized, and applied to content in order to generate a representation that allows a deeper searching that may be based on meaning.

In embodiments, a representation of the knowledge of an organization may be generated in the form of a knowledge graph, in a scalable, sustainable manner.

As used herein, the word "organization" may mean any size or type of organization.

Figure 1:
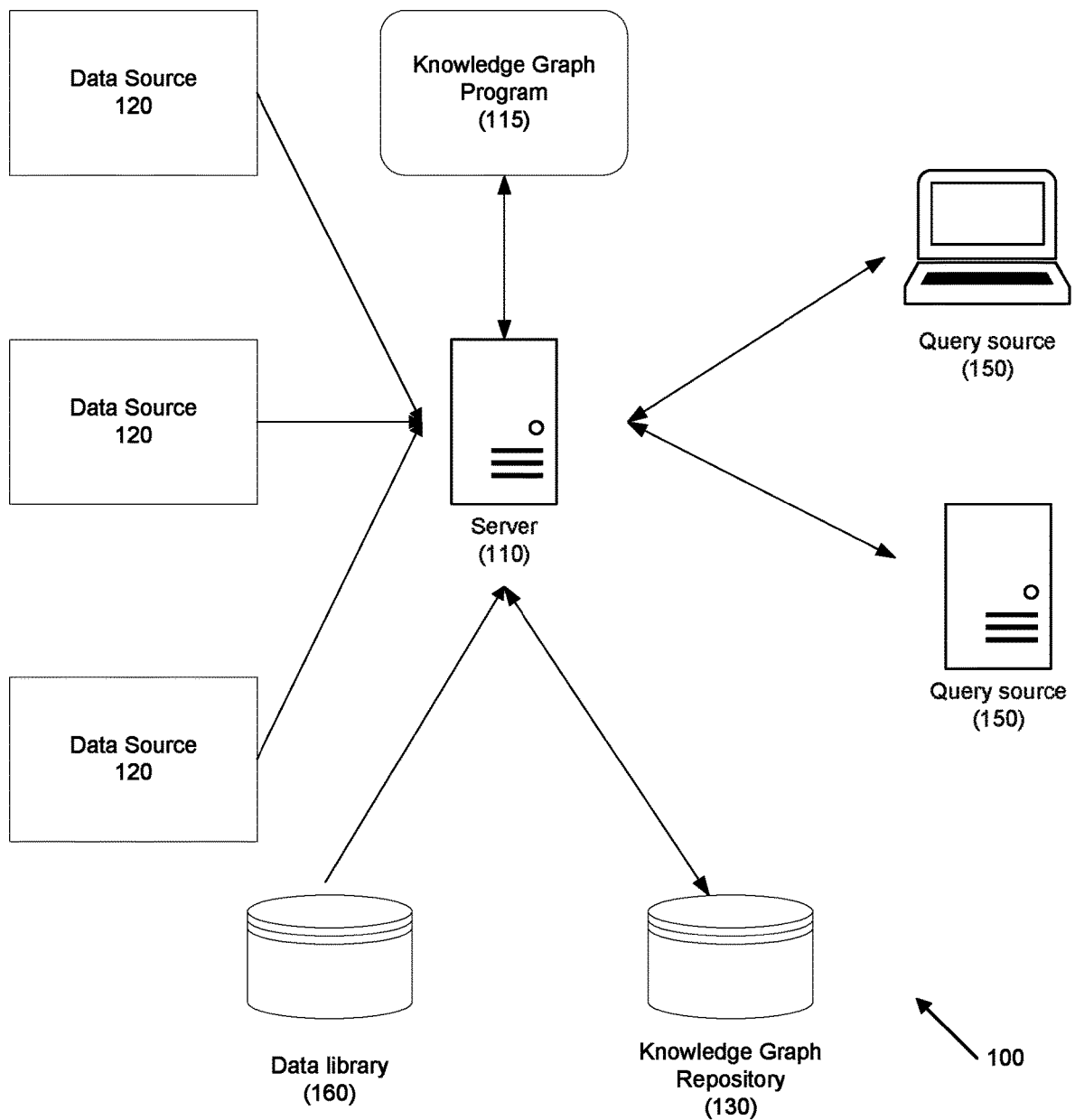
FIG. 1 discloses a system for using a knowledge graph to perform search on heterogeneous document sources according to one embodiment.

Referring to FIG. 1, a system for using a knowledge graph to perform search on heterogeneous document sources is provided according to one embodiment. System 100 may include server 110, which may be a physical server, a cloud-based server, etc. may be provided and may execute knowledge graph program 115. Server 115 may interface with one or more data source 120 and one or more query source 150. Examples of data sources may include document and content repositories within an organization, from third party sources, etc.

Examples include document management systems where an organization manages the full life cycle of documents, content repositories which store more localized general content, communication archives subject to authentication and access privilege, such as email systems and messaging, external services, both subscription-based and open, web sites that can be scraped subject to licensing, etc.

Query source 150 may be any suitable system or device that may submit a query to knowledge graph program 115. In one embodiment, query source 150 may be a computer (e.g., laptop, desktop, notebook, workstation, etc.), a smartphone, an Internet of Things (IoT) appliance, etc. In one embodiment query source 150 may include one or more downstream system.

One or more data library 160 may be provided. Data library 160 may include standard libraries, specific libraries, dictionaries, etc. that may be used to identify facts in data from data sources, etc.

Example of external data from data libraries may include laws, regulations, guidance, speeches, case law, news, etc. Examples of internal data from data libraries may include obligations, policies, procedures, issues, matters requiring attention (MRAs), contracts, disclosures, prospectuses, etc.

Figure 2:
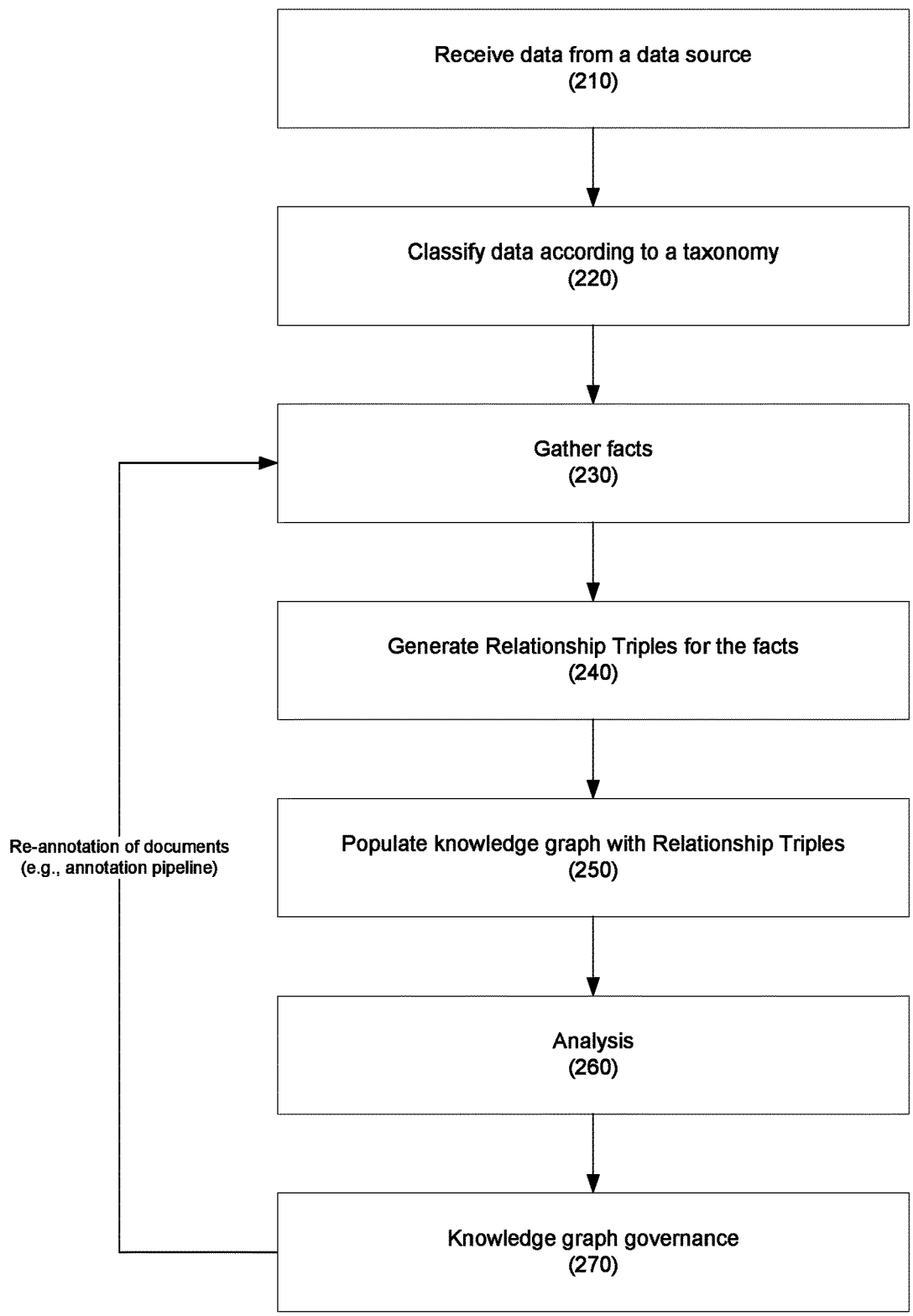
FIG. 2 discloses a method for generating a knowledge graph according to one embodiment.

Referring to FIG. 2, a method for generating a knowledge graph is provided according to one embodiment. In step 210, data (e.g., knowledge) may be received from one or more source. For example, documents and content from one or more document and content repositories within the organization may be retrieved and analyzed. In one embodiment, content repositories may include relational databases, graph databases, XML or HTML databases, or any other suitable content source.

In another embodiment, knowledge may be retrieved from an individual, such as a member of the organization, either directly or from their internal online profile and content (e.g., email, messaging, documents, etc.).

Any suitable data source may be used as is necessary and/or desired. In embodiments, data sources that are internal to an organization, or with the organization's custody and/or control may provide a greater likelihood that the data retrieved from these sources is accurate and/or true.

In step 220, the data from the data source(s) may be classified according to a taxonomy. In one embodiment, the taxonomy may be manually identified; in another embodiment, the taxonomy may be identified using supervised, semi-supervised, or unsupervised machine learning.

The taxonomy may be any suitable taxonomy. In one embodiment, the taxonomy may be based on the organization, such as the type of organization, goods or services produced or used, agreements, parties, etc.

In one embodiment, the taxonomy may "come with" the data. In another embodiment, the taxonomy may be created for manual or machine learning cases.

In one embodiment, the taxonomy selected may provide a framework for knowledge graph enhancement classification and grouping (e.g., clustering).

In one embodiment, manual training may be used to identify and classify the data.

In step 230, facts may be gathered from the data. In one embodiment, facts may be gathered by machine learning, by manual entry, etc. For example, standard libraries may be used in the automation of gathering facts. Specifically, concepts in the standard libraries may be identified, and additional terms that derive from these concepts may be added. Examples include Legal (Legal Knowledge Interchange Format (LKIF), Black's Law Dictionary), Financial (Information Framework (IFW), Banking Data Warehouse (BDW), Financial Industry Business Ontology (FIBO), etc.) that provide the baseline universal concepts of the knowledge graph.

In one embodiment, keywords searching and identification may be employed. For example, the data may be reviewed for keywords that may be present in a certain piece of data (e.g., a document) but may not be present in the global universe of data. In machine learning processes, the keywords may be associated with words that are proximate (e.g., within a predetermined number of words, within the same sentence, etc.). In one embodiment, the keywords may be associated through a "part of speech" relationship within a sentence. In one embodiment, synonyms may be identified for the keywords.

In one embodiment, a standard document structure may be used to assist in the automated gathering of facts. For example, the standard structure of certain documents may be used to identify important terms and concepts (e.g., summary, glossary, section titles, etc.), and may give them more weight as compared to those elsewhere in the document.

In one embodiment, the standard document structure may be provided by a library.

Text/semantic analysis may also be used to identify facts. For example, analytical tools (e.g., Term Raider, Word2Vec, Stanford NLP, Doc2Vec, etc.), may be run to extract terms, concepts and semantics to automate the capture of facts.

Embodiments may support dialects that harvest specific knowledge for individual communities and translate into the universal concepts. In one embodiment, a dialect database may be provided to assist in the identification of concepts.

Embodiments may analyze additional ingested content (e.g., laws, rules, case law, policies, procedures, obligations, prospectuses, etc.) for knowledge graph expansion. In one embodiment, the additional ingested content may be from data sources that are internal or external to the organization.

In one embodiment, non-English language documents may be supported by using language tools that may translate the documents into universal concepts.

In step 240, relationship triples may be generated for the facts. In one embodiment, the relationship triples include a subject, a predicate, and an object. A predicate represents the relationship between two entities, a subject and an object. For example, in the relationship triple, "car is a vehicle", the subject "car" has an "is a" relationship to the object "vehicle".

In one embodiment, the relationship triple may be a RDF triple. In another embodiment, the relationship triple may be based on other formats, including NoSQL databases such as BerkeleyDb or Apache Cassandra, relational databases such as Oracle, object databases such as Gemstone, flat files, etc.

In step 250, a knowledge graph may be populated with the relationship triples. In one embodiment, the nodes of the graph may comprise the subject and object, and the edges may comprise the predicate. Each edge may further include a weighting that describes the strength of that predicate relationship.

For example, predicates between objects may have a stochastic value ranging from 0 (i.e., no relationship exists) to 1 (i.e., a relationship definitely exists). In one embodiment, implied concepts that are related to explicit concepts may then take on a relative importance compared to the explicit concepts based on those stochastic values. The weightings may be an approximation that may be used in place of a fully-defined context, which may also be inferential rules.

In embodiments, the taxonomy may identify the manner in which nodes relate and may have high semantic power when determining the meaning of a search and how that maps into the ranking of returned values. The taxonomy may provide a consistent categorization as a basis on which all other relationships may be built.

In one embodiment, the granularity of a node's descendants over time may be controlled.

In embodiments, the weightings may be adjusted based on feedback (active and passive) so that results are tuned according to detected inaccuracies. For example, some predicates (e.g., is, are) have stronger weightings. Initial weightings may be determined through governance, machine learning techniques, etc. That is, some things are "known" (e.g., a treasury bill is issued by the United States Government), some things are probabilistic.

Examples of passive feedback include the use of search terms, the use of search results, selection of a result, annotations, content sharing, subscriptions, etc. Examples of active feedback include liking a result, providing a user survey, providing a user interview, etc.

In embodiments, the weightings and/or taxonomy may be refined based on, for example, governance oversight (centralized changes to accommodate different viewpoints in order to maintain consistency, such as proposed updates for one group that have to be accommodated with regard to other groups). In embodiments, the taxonomies, which are somewhat arbitrary classification schemes, may be adjusted, but the terms that are captured (e.g., the vocabulary) do not change.

In one embodiment, the generation and population of the knowledge graph may be an iterative process. For example, as the knowledge graph is populated, it may be rebalanced, etc. as is necessary and/or desired.

In one embodiment, the knowledge graph may be populated using a curation process. A curation process ensures that content has appropriate metadata so that it can be accurately stored, retrieved, and leveraged by the organization. The knowledge graph may be used to identify additional metadata, that is not explicitly carried by any document, that captures the important semantics. A curation process evaluates the accuracy of the additional metadata, and refines the knowledge graph accordingly.

Figure 3:
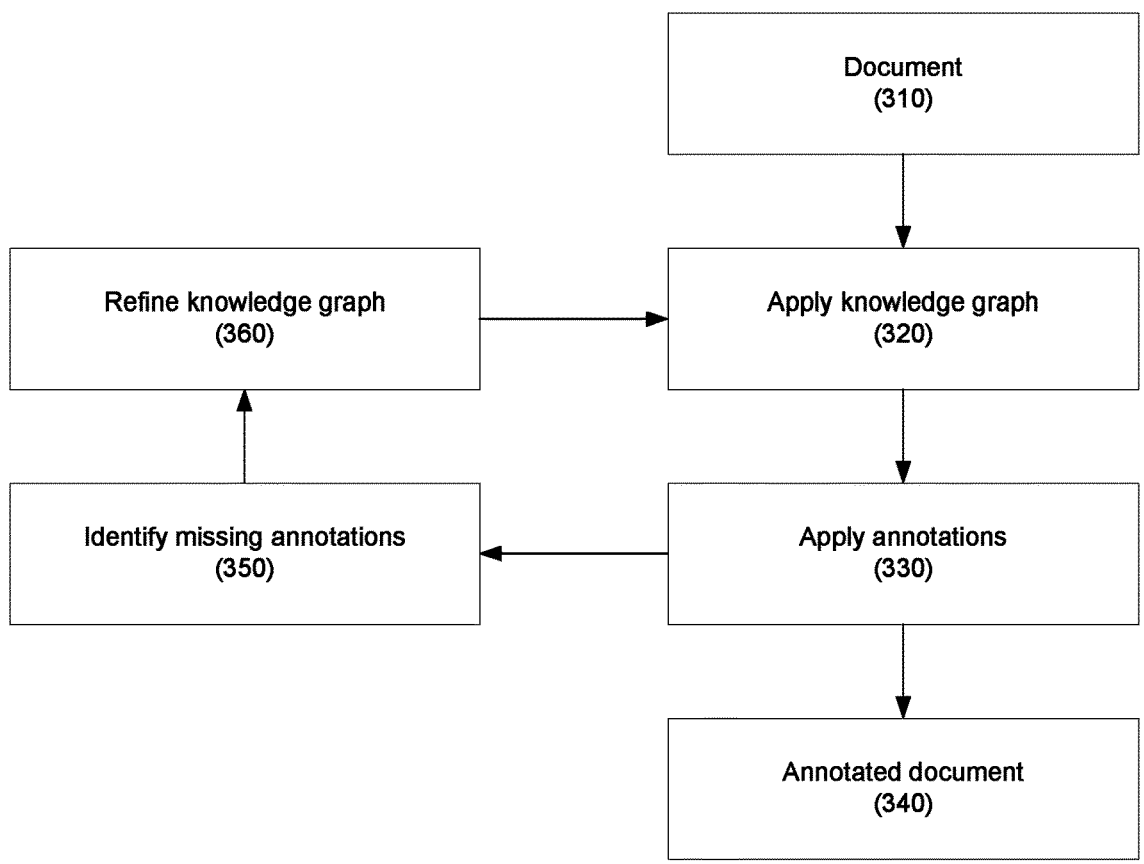
FIG. 3 depicts an exemplary curation process according to another embodiment.

An example curation process is provided in FIG. 3.

In step 310, a document is received, and in step 320, the knowledge graph is applied to the document, which may result in a set of metadata, e.g., annotations, that are associated with particular parts of the document such as a word or phrase.

In step 330, the annotations may be applied to the document by, for example, matching text patterns against the knowledge graph, and adding each annotation as an additional piece of metadata identifying the text and the concept. Following the annotations, the document becomes an annotated document in step 340.

After the annotations are applied, in step 350, any missing annotations are identified, and, in step 360, the knowledge graph may be refined with the missing annotations. For example, identifying missing annotations is primarily a governance task, but is helped by analytical tools that, for example, focus on documents that have an unusually low number of concepts. In one embodiment, the profile of each document, each piece of a document (e.g., a paragraph), may be reviewed to identify those most likely to have missing concepts. This may be performed iteratively, and the document graph may be refined during the process.

In one embodiment, the identified annotations (e.g., text and concept) may be added to each document as metadata, resulting in an annotated document. In one embodiment, documents may already be annotated with explicit metadata that may also be available for searching; this process may enhance the existing metadata.

Figure 4A:
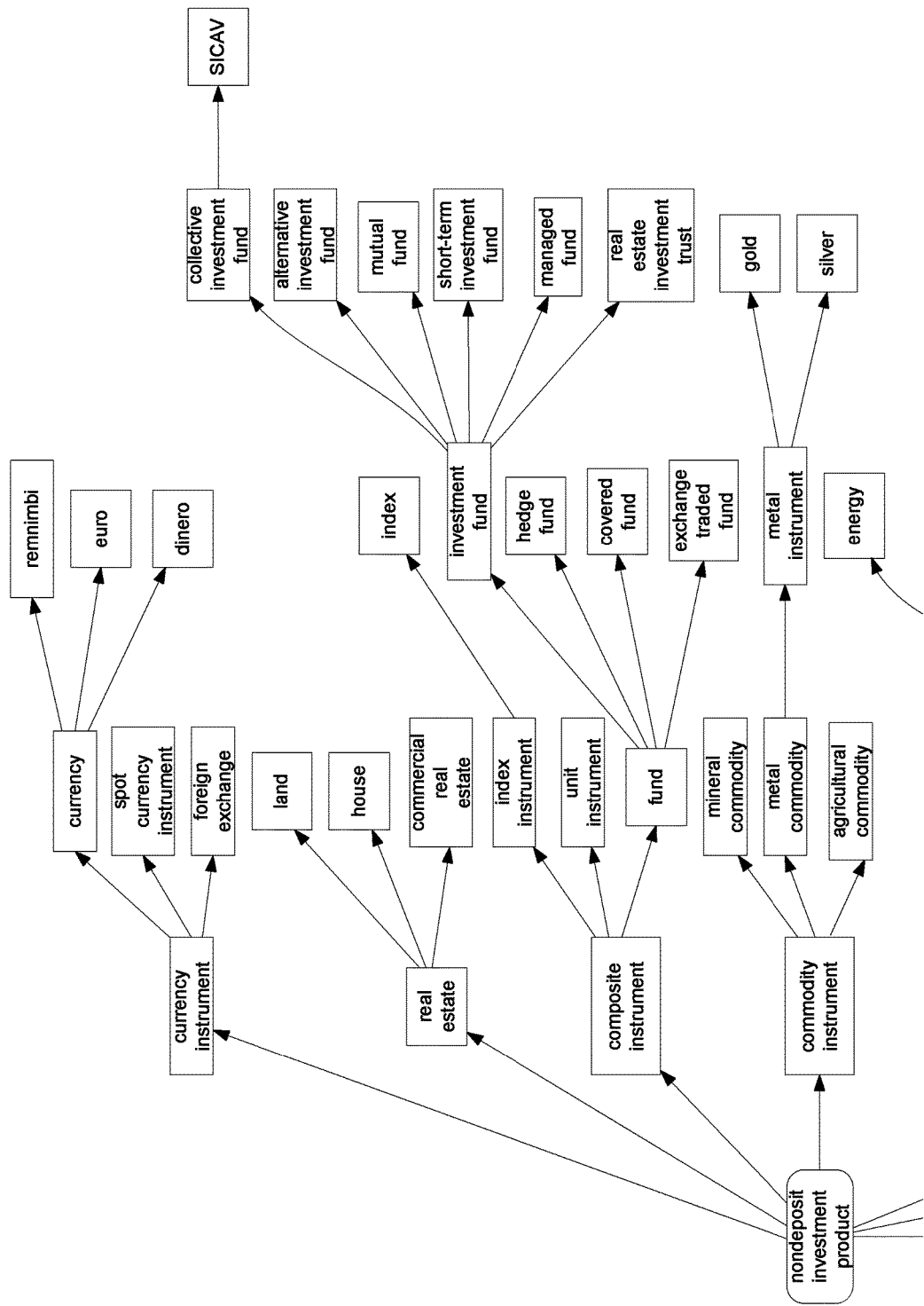
FIGS. 4A-4C depict an exemplary knowledge graph according to one embodiment.
Figure 4B:
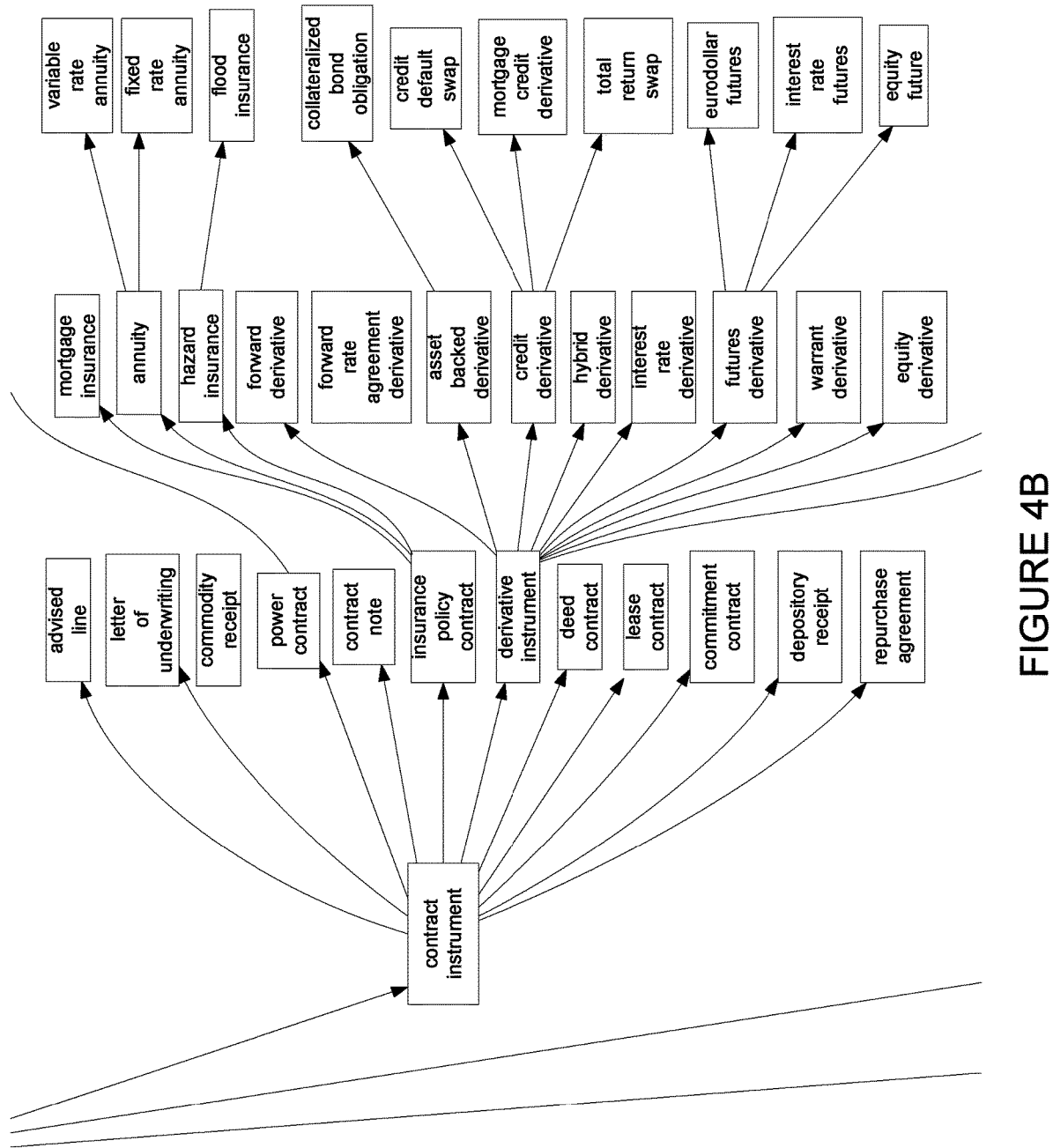
Figure 4C:
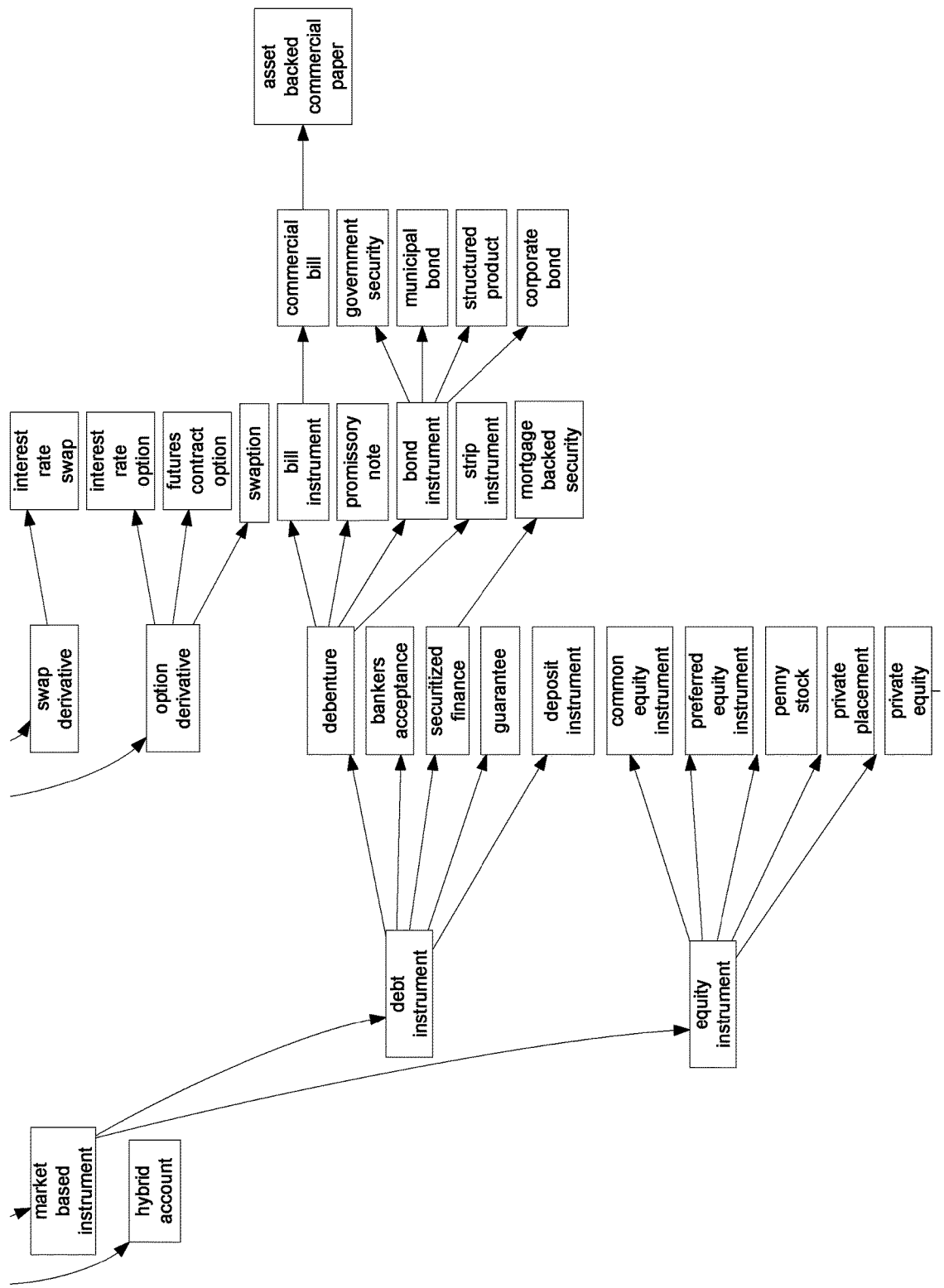

An example knowledge graph for "non-deposit investment product" is provided in FIGS. 4A-4C.

In step 260, the knowledge graph may be used for analysis. In one embodiment, when a user of system enters a query, the query may be analyzed by the knowledge graph to add meaning to the raw text. Combining this meaning with the raw text augments a normal text search of the corpus of documents so that more specificity can be applied to both retrieve and rank documents more accurately against the intention of the user. Moreover, the relationships inherent in the knowledge graph enables relatedness and connectedness to be included in the evaluation of search results.

For example, a fact, or knowledge, may be entered as a query, and related information may be retrieved based on the related edges and connected nodes. Thus, procedures may be in place to prevent certain activities (e.g., loans to members of a Board of Directors of an organization, loans to insiders), to comply with policies, laws, regulations, etc.

In one embodiment, the knowledge graph may serve as a translation engine. For example, English-language terms and non-English language terms may be related between languages as synonyms or may have some other relationship (e.g., parent-child).

In step 270, knowledge graph governance may be performed. In one embodiment, documents may be re-annotated and the process may be repeated. The process from step 270 to step 230 may be considered to be an annotation pipeline.

Figure 5:
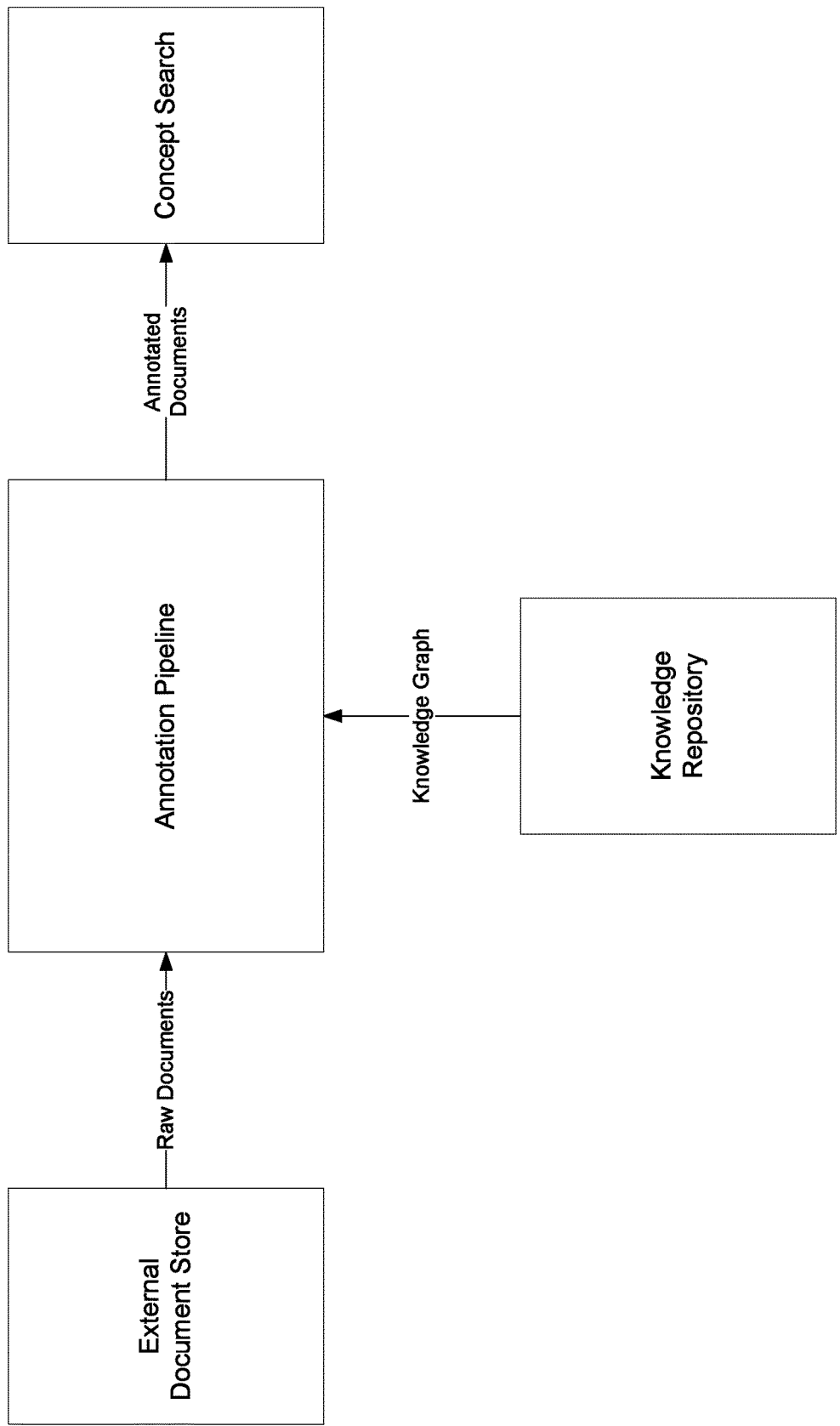
FIG. 5 depicts an annotation pipeline according to one embodiment.

FIG. 5 depicts an annotation pipeline according to one embodiment. The annotation pipeline may be upgradeable with new versions of the knowledge graph, may be easily configured, and may provide alternate partitioning of terms into gazetteers.

In one embodiment, the curation process depicted in FIG. 3 and the annotation pipeline in FIG. 5 have some overlap, as part of the curation process is to evaluate the annotations produced by the existing knowledge graph to refine and improve the knowledge graph.

In one embodiment, the annotation pipeline may perform the first iteration of annotations that may be used for concept searching; asynchronously, the annotations may be evaluated to identify missing annotations (e.g., using the process of FIG. 3), to refine the knowledge graph.

Once the refined knowledge graph is released, the next iteration of annotations may be generated to improve concept searching.

In one embodiment, the annotation pipeline is a processing step that takes a document and produces a set of metadata, e.g., annotations that can be used by the search process.

As illustrated, an external document store may provide raw documents to the annotation pipeline. The annotation pipeline may receive knowledge graph data from the knowledge repository, and may output annotation documents which may then be searched by using the annotations to augment any other search algorithm. The annotations represent concepts that may be searched for by applying the annotation pipeline to the search query itself in order to discover which concepts are present within the query.

In one embodiment, the knowledge graph may be used to provide annotations to the context that may be consumed and/or acted upon by a suitable search engine (e.g., Elastic, Solr, etc.) with or without modification to the search engine. This may provide the capability to integrate data and information without an application-driven API. Rather, data may be shared without direct integration. This may be referred to as a "virtual data infrastructure," and the knowledge graph provide an interface for such an infrastructure.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for generating a knowledge graph, comprising:
   in an information processing apparatus comprising at least one computer processor:
   receiving data from at least one data source;
   identifying facts in the data;
   generating a relationship triple for each fact, wherein the relationship triples identify a subject, a predicate, and an object; and
   populating a knowledge graph comprising nodes and edges with the relationship triples, wherein the nodes represent the subjects and the objects, and the edges represent the predicates, wherein each edge is associated with a weighting indicating a strength of the predicate relationship between the subject and the object.

2. The method of claim 1, wherein the relationship triple is based on a taxonomy.

3. The method of claim 2, wherein the taxonomy is based on at least one of an organization type, a good or service, entities, and an agreement.

4. The method of claim 2, wherein the taxonomy is generated from the data.

5. The method of claim 1, wherein the data source comprises at least one of a relational database, a graph database, an XML database, and a HTML database.

6. The method of claim 1, wherein the facts are identified using a standard library.

7. The method of claim 6, wherein the standard library includes at least one of a legal library and a financial library.

8. The method of claim 1, wherein the facts are identified using keyword searching, text analysis, or semantic analysis.

9. The method of claim 1, further comprising:
expanding the knowledge graph based on additional content comprising at least one of laws, rules, policies, and procedures.

10. The method of claim 1, wherein the weightings are at least partially based on user feedback.

11. The method of claim 10, wherein the user feedback comprises active feedback.

12. The method of claim 10, wherein the user feedback comprises passive feedback.

13. The method of claim 1, wherein the weightings are at least partially based on machine learning.

14. The method of claim 1, wherein the population of the knowledge graph is an iterative process.

15. The method of claim 1, wherein the knowledge graph is populated using a curation process.

16. The method of claim 1, further comprising:
receiving, from a query device, a query;
identifying at least one of a node and an edge related to the query; and
returning the identified at least one node and edge to the query device.

17. A system for generating a knowledge graph, comprising:
at least one data source;
a knowledge graph repository; and
a computing device comprising at least one computer processor and executing a computer program;
wherein:
the computer program receives data from at least one data source;
the computer program identifies facts in the data;
the computer program generates a relationship triple for each fact, wherein the relationship triples identify a subject, a predicate, and an object;
the computer program populates a knowledge graph comprising nodes and edges with the relationship triples, wherein the nodes represent the subjects and the objects, and the edges represent the predicates, wherein each edge is associated with a weighting indicating a strength of the predicate relationship between the subject and the object; and
the computer program stores the knowledge graph in the knowledge graph repository.

18. The system of claim 17, wherein the facts are identified using keyword searching, text analysis, or semantic analysis.

19. The system of claim 17, wherein the weightings are at least partially based on user feedback, wherein the user feedback comprises at least one of active feedback and passive feedback.

20. The system of claim 17, further comprising at least one query device; wherein:
the computer program receives a query from the query device;
the computer program identifies at least one of a node and an edge related to the query;
the computer program returns the identified at least one node and edge to the query device.

* * * * *